United States Patent
Rohde

(10) Patent No.: US 7,349,595 B2
(45) Date of Patent: Mar. 25, 2008

(54) BANDPASS FILTER AND METHOD FOR INCREASING THE SENSITIVITY ON RECEPTION OF AN OPTICAL SIGNAL

(75) Inventor: Harald Rohde, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 398 days.

(21) Appl. No.: 10/761,848

(22) Filed: Jan. 21, 2004

(65) Prior Publication Data

US 2004/0252963 A1 Dec. 16, 2004

(30) Foreign Application Priority Data

Jan. 21, 2003 (DE) ............... 103 02 142

(51) Int. Cl.
*G02B 6/26* (2006.01)
(52) U.S. Cl. .............. 385/27; 385/15; 385/31; 385/147
(58) Field of Classification Search ........... 385/15, 385/27, 31, 147
See application file for complete search history.

(56) References Cited

U.S. PATENT DOCUMENTS 6,904,214 B2 * 6/2005 Farroni et al. ............. 385/123

FOREIGN PATENT DOCUMENTS

DE 696 05 116 T2 11/1999
EP 0 909 403 B1 4/1999

OTHER PUBLICATIONS

Tietze, Halbleiter-Schaltungstechnik, 6 Auflage, 1983, Springer-Verlag, Berlin pp. 412-417.
Rienecker, Elektrische Filtertechnik Oldenburg Verlag, Muenchen, Wien 1981, p. 87-89.
Vahldiek, active RC-filter, R. Oldenburg, Muenchen, Wien 1972, p. 45-53.

* cited by examiner

*Primary Examiner*—Frank G. Font
*Assistant Examiner*—Michael P. Mooney
(74) *Attorney, Agent, or Firm*—Bell, Boyd & Lloyd LLP

(57) ABSTRACT

A bandpass filter, and associated method, are provided for an optical data signal, wherein the transmission curve of the bandpass filter has a passband at a mid-frequency for a particular bandwidth. The transmission curve has an attenuation range which covers the mid-frequency. This makes it possible to effectively increase the sensitivity of optical reception, particularly at a high data rate. When use is made of a number of bandpass filters having passbands which are arranged next to one another spectrally, such arrangement is highly suitable for a WDM signal.

6 Claims, 2 Drawing Sheets

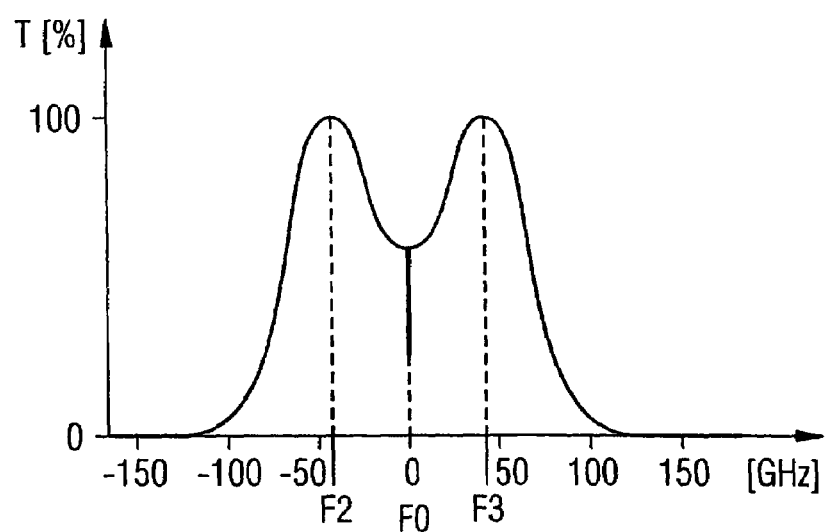
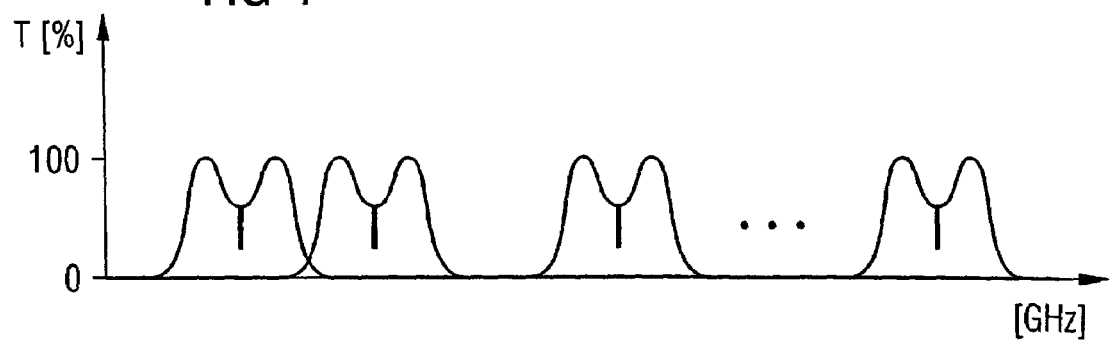

BANDPASS FILTER AND METHOD FOR INCREASING THE SENSITIVITY ON RECEPTION OF AN OPTICAL SIGNAL

BACKGROUND OF THE INVENTION

The transmission capacity of optical wavelength division multiplexed channels in a WDM transmission system can be increased by reducing the frequency separation between the individual optical channels. The spectral efficiency of the transmission system increases with a continual reduction in the frequency separation and simultaneous increase in the channel data rate. At the same time, the demands imposed on the optical filters which separate the individual optical channels from one another also increase. On the one hand, such optical filters must allow the wanted signal to pass unimpeded as far as possible but, on the other hand, interference from the adjacent channels should be suppressed as efficiently as possible.

An optical channel selected in this manner arrives at a receiver which converts the amplitude-modulated light to a sequence of electrical pulses. A receiver of this type is not ideal, in practice; that is, the bandwidth of electronic processing is limited. The decision unit provided at the receiver requires a certain amount of time to distinguish between a logic one and a logic zero of the pulses, so that the time base of the receiver (such time base being synchronized with the clock of the received signal), has a certain amount of jitter. High-bit-rate data in the received signal, thus is not read correctly.

An object of the present invention is therefore, to provide a bandpass filter which has optimum spectral efficiency in high-bit-rate optical transmission systems, preferably with regard to optical reception. The bandpass filter should, in particular, be suitable for filtering one or more channels in a WDM or DWDM signal.

SUMMARY OF THE INVENTION

On the basis of a bandpass filter for an optical data signal, the transmission curve of which has a passband at a mid-frequency for a bandwidth Δf, the transmission curve has an attenuation range which covers the mid-frequency. According to the present invention, attenuation improves the capability to pass frequencies with a desired frequency separation from the mid-frequency. For this purpose, the attenuation range in the region of the mid-frequency may be defined as narrowband or as a transmission notch with steep edges.

A favorable setting shows that the capability to pass frequencies with a frequency separation, which approximately to one or two times the data rate, from the mid-frequency is increased by up to 30% in comparison to the capability to pass frequencies close to the mid-frequency.

Optimum filter parameters for the bandpass filter according to the present invention are obtained, when a WDM signal having at least one channel is transmitted, as a function of the channel data rate, the channel separation or channel separations (in the case of non-equidistant channels) and the width of the decision window of a downstream optical receiver; that is to say, the time interval which the decision circuit requires in order to distinguish between a logic one and a logic zero of a data signal.

One fundamental advantage of the method according to the present invention is that, when a number of bandpass filters are arranged next to one another (i.e., their passbands are arranged next to one another spectrally), it is possible to implement filter arrangements which can efficiently filter broadband data signals at different wavelengths. Filters such as these are currently known as "interleavers" and may be implemented, for example, by arranging known Bragg filters next to one another.

The bandpass filter or a number of bandpass filters, according to the present invention having mid-frequencies which are arranged next to one another likewise may be used as a reflector.

A further advantage of the present invention is that the use of the bandpass filter makes possible an effective method for increasing the sensitivity of an optical receiver for a data signal at an optical carrier frequency. Increasing the sensitivity is very effective particularly if the optical receiver has a wide decision window.

It goes without saying that the present invention also is suitable for low-bit-rate data signals as in the case of electrical signals, in which case the bandpass filter should be in the form of an electronic unit, for example. It follows from this that the bandpass filter according to the present invention may be implemented for any desired bit rates.

Additional features and advantages of the present invention are described in, and will be apparent from, the following Detailed Description of the Invention and the Figures.

BRIEF DESCRIPTION OF THE FIGURES

FIG. 3 shows a third transmission curve of a bandpass filter according to the present invention.

FIG. 4 shows the frequency spectrum for a filter arrangement having a number of bandpass filters according to the present invention.

DETAILED DESCRIPTION OF THE INVENTION

Figure 1:
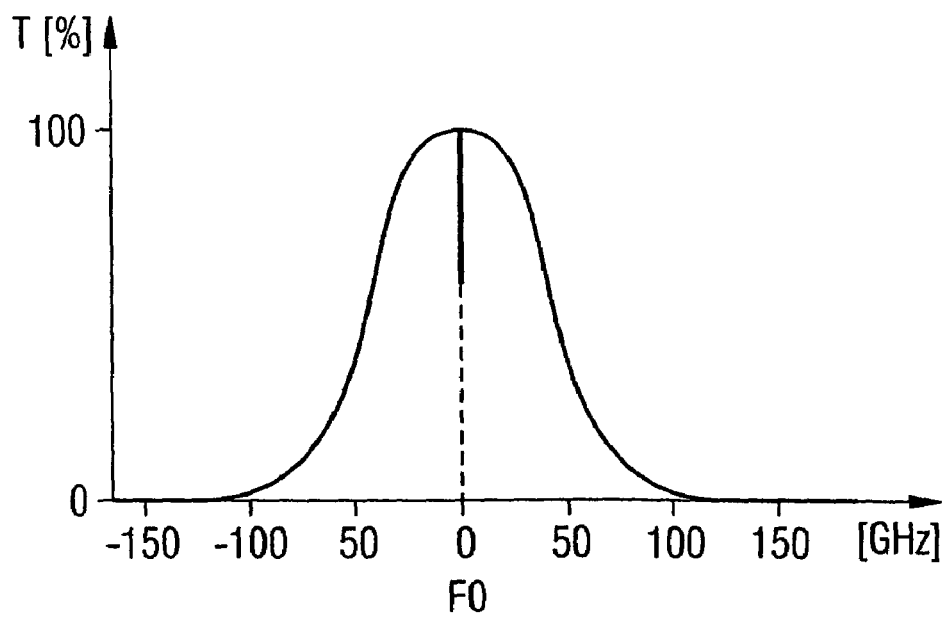
FIG. 1 shows a first transmission curve of a bandpass filter according to the present invention.

FIG. 1 shows a first transmission curve T of a bandpass filter according to the present invention having a passband Δf around a mid-frequency F0 which corresponds to a carrier frequency F1 for a data signal to be filtered. The mid-frequency F0 is preferably 0 Hz here, but in practice occurs in the optical or radio-frequency band. The transmission curve T has an attenuation range which occurs substantially at the mid-frequency F0. In the present example, the attenuation range is narrowband and steep. In theory, the attenuation range may be described using a pulsed function, but should not give rise to any sudden interfering phase changes in the optical filtered data signal. If need be, a linear phase shift could be allowed in the filtered data signal. A high-order IIR filter, inter alia, may be used to implement the bandpass filter according to the present invention.

Figure 2:
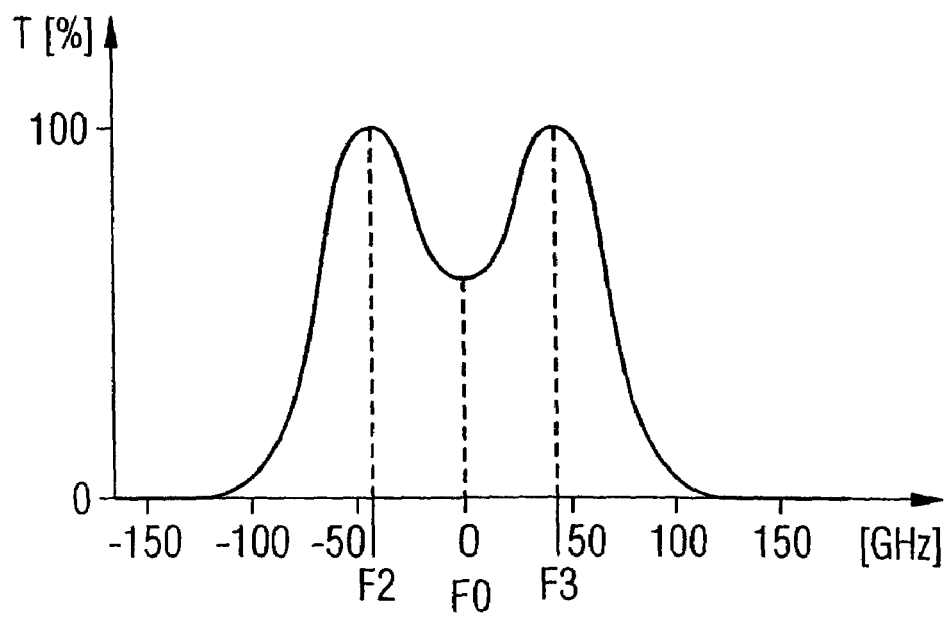
FIG. 2 shows a second transmission curve of a bandpass filter according to the present invention.

FIG. 2 shows a second transmission curve T of the bandpass filter according to the present invention. The attenuation range has been selected to be U-shaped or V-shaped in this case, so that a passband minimum at the mid-frequency F0 is produced between two passband maxima at the adjacent frequencies F2, F3. The passband minimum at the optical mid-frequency F0 of the bandpass filter has been selected to be as narrowband as possible and is approximately 10-30% lower than a passband maximum at the adjacent frequencies F2, F3. The gain in sensitivity is better, the more narrowband this suppression. Furthermore, the capability to pass frequencies with a frequency separation F0-F2, F3-F0 (corresponding approximately to half to twice the data rate) from the mid-frequency F0 is increased by up to 30% in comparison to the capability to pass frequencies close to the mid-frequency F0. It goes without saying that further settings may be selected for the passband or attenuation range. When transmitting a WDM signal having a number of channels, filter parameters of bandpass filters which are arranged next to one another may be set separately for each channel.

FIG. 3 shows a third transmission curve T of the bandpass filter according to the present invention, which is formed from a combination of the attenuation ranges shown in FIGS. 1 and 2. For this example, the transmission curve T having the mid-frequency F0 is represented via the following normalized transfer function H(f):

$$H(f) = c_1 * e^{-c_2*(f-F0)^f} + \sum_{k=1}^{2} c_3 * e^{-(c_4*(f-F0+(-1)^k*c_5))^2} + c_6 * \delta(f-F0)$$

where c1, c2, . . . , c6 are setting coefficients and δ(f) denotes a function where δ(f=F0)=1 and δ(f≠F0)=0.

This achieves good flexibility in the settings of the bandpass filter. Of course, other transfer functions H(f) may be defined, for example, for an asymmetric configuration of the transmission curve T over the bandwidth, which in particular cases could be more suitable than the symmetric transmission curve T shown here.

FIG. 4 shows a transmission curve of a filter arrangement having a number of bandpass filters according to the present invention, the passbands of which are arranged next to one another. Different filter arrangements are possible, particularly in the case of a WDM or DWDM signal:

All mid-frequencies of the bandpass filters are set at the carrier frequencies of the channels in the WDM signal.

Only the even or odd channels are filtered.

Specific channels are filtered or reflected between two or more adjacent bandpass filters.

This makes it possible to implement very flexible periodic or non-periodic interleavers as well as add/drop modules which, in the event of subsequent optical reception, significantly increase the sensitivity.

Although the present invention has been described with reference to specific embodiments, those of skill in the art will recognize that changes may be made thereto without departing from the spirit and scope of the present invention as set forth in the hereafter appended claims.

The invention claimed is:

1. An apparatus for filtering an optical data signal, comprising a bandpass filter including a transmission curve characteristic having a passband at a mid-frequency for a bandwidth, wherein the transmission curve has an attenuation range which covers a part of the mid-frequency.

2. The apparatus as claimed in claim 1, wherein the attenuation range is narrowband in a region of the mid-frequency.

3. The apparatus as claimed in claim 1, wherein the attenuation range is one of U-shaped and V-shaped.

4. The apparatus as claimed in claim 2, wherein the attenuation range contains a combination of (a) a U-shaped profile and a V-shaped profile away from the mid-frequency (F0), and (b) a narrowband profile at the mid-frequency (F0).

5. The apparatus as claimed in claim 1, wherein the transmission curve having the mid-frequency is represented by a normalized transfer function H(f) as follows:

$$H(f) = c_1 * e^{-c_2*(f-F0)^f} + \sum_{k=1}^{2} c_3 * e^{-(c_4*(f-F0+(-1)^k*c_5))^2} + c_6 * \delta(f-F0)$$

where (c1, c2, . . . , c6) are setting coefficients and δ(f) denotes a function where δ(f=F0)=1 and δ(f≠F0)=0.

6. A method for increasing a sensitivity of reception of an optical data signal at an optical carrier frequency, the method comprising the steps of:

providing a bandpass filter for the optical data signal, wherein the bandpass filter has a transmission curve having a pass band at a mid-frequency for a bandwidth, and with the transmission curve having an attenuation range which covers a part of the mid-frequency, and the mid-frequency being at the carrier frequency; and providing that at least the optical data signal upstream of optical reception pass through the bandpass filter.

* * * * *